United States Patent
Falk et al.

(10) Patent No.: US 9,043,599 B2
(45) Date of Patent: May 26, 2015

(54) METHOD AND SERVER FOR PROVIDING A MOBILITY KEY

(75) Inventors: Rainer Falk, Eching (DE); Christian Günther, Neubiberg (DE); Dirk Kröselberg, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1611 days.

(21) Appl. No.: 12/084,558

(22) PCT Filed: Oct. 31, 2006

(86) PCT No.: PCT/EP2006/067955
§ 371 (c)(1),
(2), (4) Date: Sep. 22, 2009

(87) PCT Pub. No.: WO2007/051787
PCT Pub. Date: May 10, 2007

(65) Prior Publication Data
US 2010/0017601 A1    Jan. 21, 2010

(30) Foreign Application Priority Data

Nov. 4, 2005  (DE) .......................... 10 2005 052 717
Mar. 2, 2006  (DE) .......................... 10 2006 009 726

(51) Int. Cl.
*H04L 9/32*    (2006.01)
*G06F 21/00*   (2013.01)
(Continued)

(52) U.S. Cl.
CPC .............. *H04L 63/062* (2013.01); *H04L 63/08* (2013.01); *H04W 12/04* (2013.01); *H04W 12/06* (2013.01); *H04W 80/04* (2013.01)

(58) Field of Classification Search
USPC ...................... 713/170, 168, 171, 182; 726/5; 380/247, 270, 277
See application file for complete search history.

(56) References Cited

U.S. PATENT DOCUMENTS 7,065,067 B2    6/2006  Song et al.
2004/0103192 A1*  5/2004  Yli-Korhonen et al. ...... 709/224
(Continued)

FOREIGN PATENT DOCUMENTS

| KR | 2003-0038915   | 5/2003 |
| WO | WO 02068418 A2 | 9/2002 |
| WO | 2004/049672 A2 | 6/2004 |

OTHER PUBLICATIONS

RFC2002 http:/www.ietf.org/rfc/rfc2002.txt, Oct. 1996.
(Continued)

*Primary Examiner* — Aravind Moorthy
(74) *Attorney, Agent, or Firm* — Staas & Halsey LLP

(57) ABSTRACT

A method and authentication server provide a mobile key. According to the method, upon receipt of an authentication message (access authentication) that is transmitted when a subscriber logs on to the network, the authentication server extracts a subscriber identification contained in said message and generates a corresponding mobile key, which is stored together with the respective extracted subscriber identification. Upon subsequent receipt of a key request message (key request) that is transmitted when a subscriber registers, the authentication server extracts a mobile identification of the subscriber contained in said message and searches for an identical mobile identification, which can be derived in accordance with a configurable derivation function from a subscriber identification that is stored in the authentication server. Once a derived mobile identification that is identical or can be uniquely assigned to the extracted mobile identification has been found, the authentication server provides the stored corresponding mobile key that has been generated, to cryptographically protect the mobile signaling messages of the registered subscriber.

20 Claims, 8 Drawing Sheets

(51) Int. Cl.
*G06F 7/04* (2006.01)
*H04K 1/00* (2006.01)
*H04L 9/00* (2006.01)
*H04L 29/06* (2006.01)
*H04W 12/04* (2009.01)
*H04W 12/06* (2009.01)
*H04W 80/04* (2009.01)

(56) References Cited

U.S. PATENT DOCUMENTS

| | | | |
|---|---|---|---|
| 2005/0176407 A1* | 8/2005 | Tuomi et al. | 455/411 |
| 2005/0198506 A1 | 9/2005 | Qi et al. | |
| 2005/0251403 A1* | 11/2005 | Shuey | 705/1 |
| 2006/0095959 A1* | 5/2006 | Williams et al. | 726/8 |
| 2007/0091843 A1* | 4/2007 | Patel et al. | 370/331 |

OTHER PUBLICATIONS

RFC3775 http:/www.ietf.org/rfc/rfc3775.txt, Jun. 2004.
RFC 2977 http://www.ietf.org/rfc/rfc.txt?number=2977, Oct. 2000.
RFC 3344 http:/www.ietf.org/rfc/rfc3344.txt, Aug. 2002.
Johannsen, Mobile IPv4 Extension for Carrying Network Access Identifiers, RFC 3486; Johannsen, Mobile IPv4 Extension for Carrying Network Access Identifiers, RFC 3846; Johannsen, Mobile IPv4 Extension for Carrying Network Access Identifiers, RFC 3846.
RFC 3957 http://www.ietf.org/rfc/rfc3775.txt?number=3957, Mar. 2005.
RFC 3776 http://www.ietf.org/rfc/rfc3776.txt?number=3776, Jun. 2004.
RFC 4285 http:/www.ietf.org/rfc/rfc4285.txt, Jan. 2006.
WiMax Forum NWG: "WiMax End-to-End Network Systems Architecture (Stage 2: Architecture Tenets, Reference Model and Reference Points)" unapproved version als of Sep. 15, 2005.
Standard IEEE 802.16, 2001.
3GPP TS 23.234 V6.6.0, Sep. 2005; 3GPP TS 23.234 V6.6.0, Sep. 2005; 3GPP TS 23.234 V6.6.0, Sep. 2005.
Adrangi Intel a Lior Bridgewater Systems J Korhonen teliasonera J Loughney Noka F.: "Chargeable User Identity", IETF Standard-Working-Draft, Internet Engineering Task Force, IETF, CH, vol. radext, No. 6, Oct. 12, 2005.
Majid Nakhjiri Narayanan Venkitaraman, Motorola Labs: "EAP Based Proxy Mobile IP Key Bootstraping for WiMax", IETF Standard-Working-Draft, Internet Engineering Task Force, IETF, CH, Jan. 2005.
RFC 2486 http:/www.ietf.org/rfc/rfc2486.txt, Jan. 1999.
RFC 3548 http:/www.ietf.org/rfc/rfc3548.txt, Jul. 2003.
Indian Office Action issued Jun. 12, 2014 in corresponding Indian Patent Application No. 3193/DELNP/2008.

* cited by examiner

FIG 1
Prior art

Mobility Binding Table

| Home Address | Care-of Address | Lifetime (ms) |
|---|---|---|
| 131.192.180.42 | 129.142.23.42 | 100 |
| 213.123.24.140 | 172.23.142.49 | 150 |
| ... | ... | ... |

FIG 2
Prior art

Visited List

| Home Address | Home Agent Address | Media Address | Lifetime |
|---|---|---|---|
| 131.192.180.42 | 129.142.23.42 | 08-00-46-26-75-6A | 100 |
| 213.123.24.140 | 172.23.142.49 | 00-02-B3-77-43-00 | 150 |
| ... | ... | ... | ... |

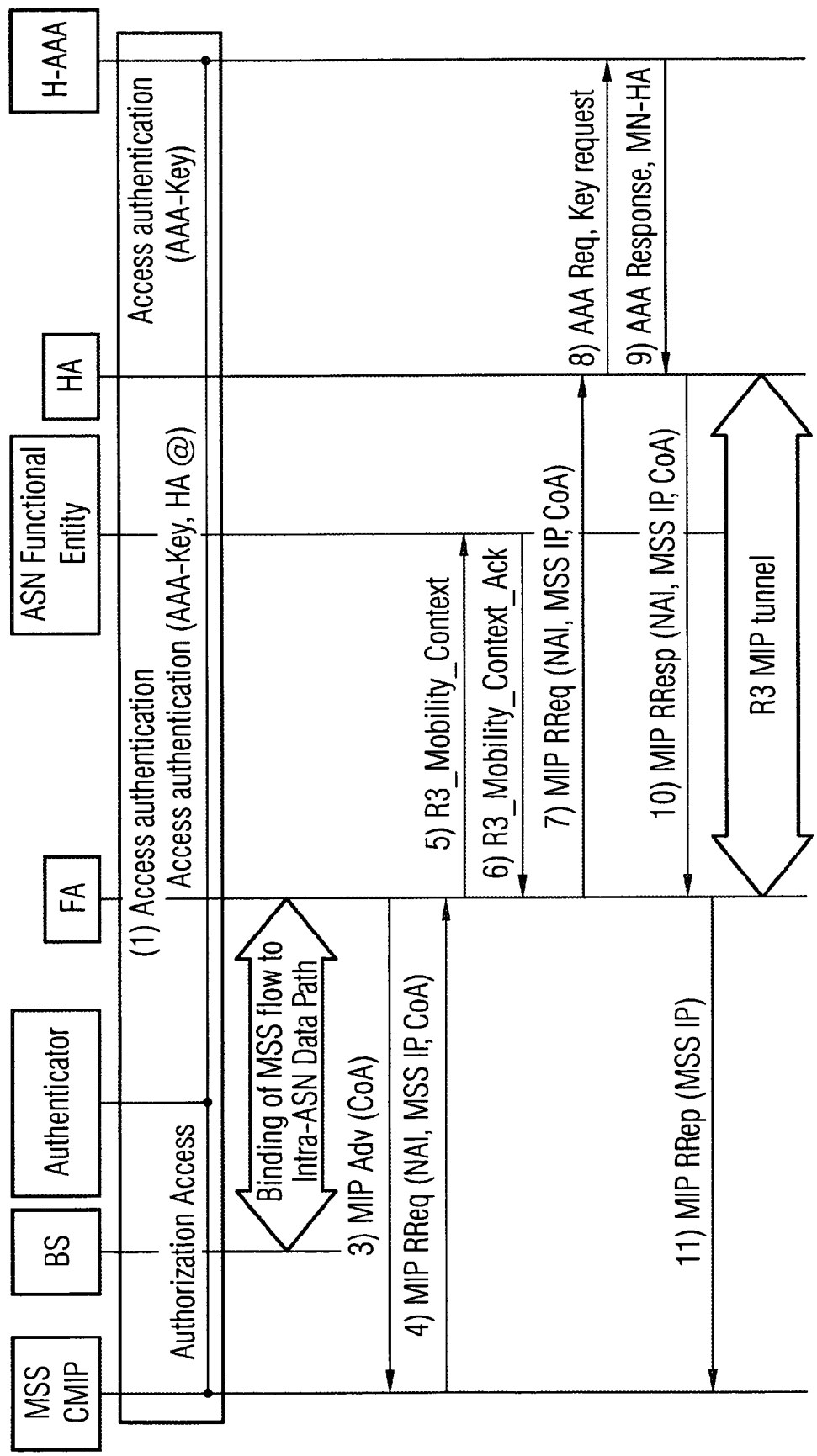

US 9,043,599 B2

METHOD AND SERVER FOR PROVIDING A MOBILITY KEY

CROSS REFERENCE TO RELATED APPLICATIONS

This application is based on and hereby claims priority to German Application Nos. 10 2005 052 717.5, filed on Nov. 4, 2005 and German Application No. 10 2006 009 726.2, filed on Mar. 2, 2006 and PCT Application No. PCT/EP2006/067955 filed on Oct. 31, 2006, the contents of which are hereby incorporated by reference.

BACKGROUND OF THE INVENTION

The invention relates to a method and an authentication server for providing a uniquely assignable mobility key for cryptographic protection of mobility signaling messages for a home agent of a mobile radio network, especially for anonymous subscribers.

The Internet with the TCP/IP provides a platform for the development of higher-level protocols for the mobile area. Since the Internet protocols are widely used, a larger group of subscribers can be included with corresponding protocol expansions for the mobile environment. The conventional Internet protocols are however not originally designed for mobile use. In the packet switching of the conventional Internet the packets are exchanged between stationary computers, which change neither their network address nor roam between different subnets. In radio networks with mobile stations, mobile stations MS are frequently linked into different networks. The DHCP (Dynamic Host Configuration Protocol) makes it possible with the aid of a corresponding server to dynamically allocate an IP address and further configuration parameters to a station in a network. A computer which is linked into a network is automatically allocated a free IP address by the DHCP protocol. If a mobile station has installed DHCP it merely has to come within the range of a local network which supports configuration using the DHCP protocol. The DHCP protocol makes dynamic address allocation possible, i.e. a free IP address is automatically allocated for a specific time. After this time elapses the request must either be made again by the mobile station or the IP address can be issued in some other way.

With DHCP a mobile station can be linked into a network without manual configuration. The only requirement is the availability of a DHCP server. A mobile station can thus make use of services of the local network and centrally stored files for example If a mobile station offers services itself however, a potential service user cannot find the mobile station since its IP address changes in each network into which the mobile station is linked. The same occurs if an IP address changes during an existing TCP connection. This leads to the connection being aborted. Thus with Mobile-IP a mobile station is allocated an IP address which it also retains in another network. With conventional IP network change it is necessary to adapt the IP address settings appropriately. An ongoing adaptation of IP and routing configurations at the station is however practically impossible manually. In conventional automatic configuration mechanisms the existing connection is interrupted when the IP address is changed. The MIP protocol (RFC 2002, RFC 2977, RFC3344, RFC3846, RFC3957, RFC3775, RFC3776, RFC4285) supports the mobility of mobile stations. With the conventional IP protocols the mobile station must adapt its IP address each time it changes IP subnet, so that the data packets addressed to the mobile station can be correctly routed. To maintain an existing TCP connection the mobile station must retain its IP address since a change of address leads to an interruption of the connection. The MIP protocol remedies this conflict by allowing a mobile station or a Mobile Node (MN) to possess two IP addresses. The MIP protocol makes a transparent connection between the two addresses possible, namely a permanent home address and a second temporary care-of address. The care-of address is the IP address under which the mobile station is currently able to be reached.

A home agent is a representative of the mobile station when the mobile station is not located in its original home network. The home agent is constantly informed about the current location of the mobile station. The home agent usually represents a component of a router in the home network of the mobile station. If the mobile station is located outside the home network, the home agent provides a function whereby the mobile station can register. The home agent then forwards data packets addressed to the mobile station into the current subnet of the mobile station.

A foreign agent is located in the subnet in which the mobile station is moving. The foreign agent forwards incoming data packets to the mobile node or to the mobile station. The foreign agent is located in what is referred to as visited network. The foreign agent likewise usually represents a component of a router. The foreign agent routes all administrative mobile data packets between the mobile station and its home agent. The foreign agent unpacks the tunneled data packets sent by the home agent and forwards their data to the mobile node.

The home address of the mobile station is the address under which the mobile station is permanently accessible. The home address has the same address prefix as the home agent. The care-of address is that IP address which the mobile station uses in the foreign network.

The home agent maintains a so-called Mobility Binding Table (MBT). The entries in this table serve to assign the two addresses, i.e. the home address and the care-of address of a mobile station to each other and to reroute the data packets accordingly. The MBT table contains entries about the home address, the care-of address and a specification about the period of time during which this assignment is valid (Life Time). FIG. 1 shows an example of a mobility binding table according to the related art.

The foreign agent (FA) contains a Visitor List (VL) which contains information about the mobile nodes located in the IP network of the foreign agent at the time. FIG. 2 shows an example for a visitor list of this type according to the related art.

So that a mobile node can be linked into a network it must first ascertain whether it is in its home network or a foreign network. In addition the mobile station must ascertain which station is in the subnet of the home or foreign agent. This information is determined by what is known as agent discovery.

Through the subsequent registration the mobile node can notify its current location to its home agent. To do this the mobile station or the mobile node sends the home agent the current care-of address. For registration the mobile station sends a registration request to the home agent. The home agent (HA) enters the care-of address into its list and replies with a registration reply. However there is a security problem with this process. Since in principle each node can send a registration request to a home agent, it would be a simple matter to fool a home agent into believing a computer had moved to another network. Thus a foreign node could accept all data packets of a mobile station or mobile node without a sender knowing that this has occurred. To prevent this, the mobile station and the home agent have a common secret key available to them. If a mobile station returns to its mobile network, it deregisters with its home agent, since the mobile station can now again accept all data packets itself. A mobile radio network must include security features such as those listed below. Information may only be made accessible for desired communication partners, i.e. undesired eavesdroppers may not be given any access to transmitted data. The mobile radio network must thus have the attribute of confidentiality. In addition authenticity must be provided. Authenticity allows a communication partner to establish without doubt whether a communication has actually been set up to a desired communication partner or whether a foreign party is presenting itself as a communication partner. The authentications can be undertaken for each message or for each connection. If there is connection-based authentication the communication partner is only identified once at the start of a session. It is assumed for the further progress of the session that the following messages also originate from the corresponding sender. Even if the identity of a communication partner is established, i.e. the communication partner is authenticated, the case can arise in which this communication partner may not access all resources or may not make use of all services over the network. In this case a corresponding authorization requires a prior authentication of the communication partner.

With mobile data networks messages must cover long distances over air interfaces and are thus easily accessible for potential attackers. With mobile and wireless data networks security aspects thus have a particular role to play. Encryption techniques represent a significant way to enhance security in data networks. Encryption makes it possible to transmit data over insecure communication paths, for example over air interfaces, without unauthorized parties gaining access to the data. For encryption the data, i.e. the so-called plain text, is transformed with the aid of an encryption algorithm into encrypted text. The encrypted text can be transported over the insecure data transmission channel and subsequently decrypted or decoded.

WiMax (Worldwide Interoperability for Microwave Access) has been proposed as a new standard which represents a promising wireless access technology and uses standard IEEE 802.16 for radio transmission. WiMax is intended to allow transmit stations to supply an area of to 50 km with data rates of over 100 Mbit per second.

FIG. 3 shows a reference model for a WiMax radio network. A mobile station MS is located in the area of an Access Serving Network (ASN). The access serving network ASN is connected via at least one Visited Connectivity Service Network (VCSN) or intermediate network to a Home Connectivity Service Network (HCSN). The different networks are connected via interfaces or reference points R to each other. The home agent HA of the mobile station MS is located in the home connectivity service network HCSN or in one of the visited connectivity service networks VCSN.

WiMax supports two implementation variants of Mobile IP, so-called Client MIP (CMIP), in which the mobile station itself implements the MIP client function, and Proxy MIP (PMIP), in which the MIP client function is implemented by the WiMax access network. The functionality provided for this in the ASN is referred to as Proxy Mobile Node (PMN) or as PMIP client. This enables MIP to be also used with mobile stations which do not support any MIP themselves.

FIG. 4 shows the connection setup for Proxy MIP when the home agent is located in the visited network according to the related art.

After a radio connection has been established between the mobile station and a base station an access authentication is first undertaken. The function of authentication, authorization and accounting is performed by what are known as AAA servers (AAA: Authentication Authorization and Accounting). Authentication messages are exchanged between the mobile station MS and the AAA server of the home network (H-AAA) by means of which the address of the home agent and an authentication key are obtained. The authentication server in the home network contains the profile data of the subscriber. The AAA server receives an authentication request message which contains a subscriber identity of the mobile station. After successful authentication the AAA server generates an MSK (MSK: Master Session Key) to protect the data link between the mobile station MS and the base station of the access network ASN. This MSK is transmitted from the AAA server of the home network via the connectivity service network CSN to the access network ASN.

After access authentication, as can be seen in FIG. 4, the DHCP proxy server is configured in the access network ASN. If the IP address and host configuration are already contained in the AAA reply message, the entire information is downloaded into the DHCP proxy server.

After successful authentication and authorization the mobile station MS sends a DHCP Discovery message and an IP address is allocated.

If the access network ASN supports both PMIP and also CMIP mobility, the foreign agent then informs the ASN handover function by sending an R3 mobility context message. This can be omitted for networks which can only support PMIP.

After the home address has been read out, it is forwarded to the PMIP client.

An MIP registration is then undertaken. In the registration the home agent is informed about the current location of the mobile station. For registration the mobile station sends the registration request to the home agent which contains the current care-of address. The home agent enters the care-of address into a list that it administers and replies with a registration reply. Since in principle each station can send registration requests to a home agent, a home agent could be fooled in a simple manner into believing that a station had moved into another network. To prevent this, both the mobile station and also the home agent have a common secret key, namely an MIP key; if the home agent (HA) does not know the MIP key, it creates it, for which purpose it communicates with a home AAA server.

After completion of the connection setup depicted in FIG. 4, the mobile station has received a home address and is registered with the home agent.

The conventional connection setup is essentially undertaken in three steps, namely the access authentication of the subscriber, a subsequent IP address allocation and finally an MIP registration. In the access authentication the user logs on directly to the mobile network. To this end, in a conventional network registration, a radio connection is first established between the mobile station MS and the Access Network ASN, with an authentication server H-AAA for authentication of the subscriber receiving at least one authentication message from the subscriber station via an authentication client of the access network. This authentication message (Access Authentication) contains data such as an external subscriber identity or Network Access Identifier (NAI). This external NAI enables the authentication server H-AAA of the subscriber to be determined. On successful authentication the authentication server H-AAA informs the authentication client of the access network about this, so that this client creates a secure radio connection to the subscriber station.

After successful IP address allocation the mobile IP registration is finally performed. To this end the home agent HA receives a registration request message which contains a user identity and directs a key request to the authentication server. After receipt of a key request for a mobility key by the authentication server the authentication server makes a mobile key available for the home agent of the subscriber if an appropriate mobility key is stored in the authentication server for the subscriber identity contained in the key request message.

With a conventional mobile network (standard mobile IP) the mobility key which is used for cryptographic protection of the mobility signaling messages is pre-configured in the authentication server H-AAA of the home network, i.e. a corresponding mobility key is stored in the authentication server H-AAA of the home network for each subscriber for their subscriber identity.

With innovative mobile radio networks, such as WiMax for example, the mobility key is however created and stored during network registration in the authentication server H-AAA, i.e. the mobility key is not pre-configured. If with a mobile radio network of this type the home agent of a subscriber directs a key request message with a subscriber identity contained within it to the authentication server of the home network, the authentication server cannot assign the subscriber identity contained in the key request message and can thus not provide any corresponding mobility key.

SUMMARY

One potential object is thus to create a method and an authentication server which always provide a mobility key for a subscriber registering with the network.

The inventors propose a method for providing at least one mobility key for cryptographic protection of mobility signaling messages, with the mobility key being generated when a subscriber registers with the network and with a subsequent registration of the subscriber with a home agent being undertaken by means of a mobility identity of the subscriber that is assigned the generated mobility key uniquely in an authentication server.

In a preferred embodiment of the proposed method at least one authentication message which contains an external subscriber identity of the subscriber is received from the authentication server during registration with the network.

In a preferred embodiment of the method the authentication server is located in the home network of the subscriber.

In a preferred embodiment of the method the authentication server of the home network can, after receiving the authentication message, generate at least one mobility key for the subscriber and stores this together with the external subscriber Identity contained in the authentication message.

In a preferred embodiment of the method the authentication server of the home network additionally stores a session identity of the subscriber for the generated mobility key and for the external subscriber identity of the subscriber.

In a preferred embodiment of the method the subscriber, on registering with a home agent, sends a registration request message (MIP RRQ) which contains a subscriber identity of the subscriber, to the home agent.

In a preferred embodiment of the method a mobility identity of the subscriber identity contained in the registration request message will be derived in accordance with a given configurable derivation function.

In a preferred embodiment of the method a mobility identity will be derived from the subscriber Identity contained in the registration request message and from a session identity (session ID) of the subscriber in accordance with a configurable derivation function.

In a preferred embodiment of the method the session identity is formed by a chargeable subscriber identity (CUI) of the subscriber.

In a preferred embodiment of the method the external subscriber identity is formed by a network access identifier (NAI).

In a preferred embodiment of the method the external subscriber identity is formed by an anonymous network access identifier NAI.

In an alternate embodiment of the method the external subscriber identity is formed by a session-specific selected pseudonymous network access identifier NAI.

In a further embodiment of the method the external subscriber identity is formed by a hash function value of a mobility identity.

In a further preferred embodiment of the method the mobility identity (MIP ID) is formed by a hash function value of an external subscriber identity.

In a preferred embodiment of the method the authentication server provides the home agent, on receipt of a key request which contains a mobility identity, with that generated mobility key which is stored for the respective external subscriber Identity from which an identical mobility identity is able to be derived in accordance with a predetermined configurable derivation function.

In a preferred embodiment of the method the authentication server provides the home agent, on receipt of a key request which contains a mobility identity, with that generated the mobility key which is stored for that external subscriber Identity from which an identity is able to be derived in accordance with a predetermined configurable derivation function which is identical to an identity derived from the mobility identity in accordance with a second predetermined configurable derivation function.

In a preferred embodiment of the method the authentication server provides the home agent, on receipt of a key request which contains a mobility identity, with that generated mobility key which is stored for that external subscriber identity which is able to be derived from the mobility identity in accordance with a predetermined configurable derivation function.

In a preferred embodiment of the method the subscriber identity is formed by a mobile subscriber station or by a PMIP client of an access network.

In a preferred embodiment of the method the generated subscriber identity is modified by an authentication client or by a foreign agent FA of an access network (ASN).

In a preferred embodiment of the method the authentication messages are each formed by a data packet of which the administration data contains an external subscriber identity. An authentication message data packet preferably features payload data which contains a subscriber-specific internal subscriber identity.

In such cases the internal subscriber identity is preferably formed by a unique subscriber name.

In an alternate embodiment the internal subscriber identity is formed by a telephone number.

In a preferred embodiment of the method the external subscriber identity contains an address for routing the data packet to the authentication server of the home network.

In a preferred embodiment of the method the registration request message is formed by a data packet which contains data such as the external subscriber identity and a current care-of address allocated to the subscriber.

In a preferred embodiment of the method the key request message is formed by a data packet of which the administration data contains a mobility identity (MIP_ID) which is preferably derived in accordance with a predetermined derivation function (AF) by the home agent from the transmitted subscriber identity.

In a preferred embodiment of the method the access network is formed by a WiMax network.

In one embodiment of the method the authentication messages are transmitted in accordance with a radius data transmission protocol.

In an alternate embodiment of the method the authentication messages are transmitted in accordance with a diameter data transmission protocol.

In a preferred embodiment of the method a connectivity service network is formed by a WiMax connectivity service network CSN.

In a first embodiment of the method the home network is a 3GPP network.

In an alternate embodiment of the method the home network is formed by a network which provides an AAA infrastructure network for WLAN subscribers (WLAN network).

The inventors also propose an authentication server for provision of a mobility key, with the authentication server, on receipt of an access authentication message transmitted when a subscriber registers with the network, extracting a subscriber identity (T-ID) of the subscriber contained therein and generating an associated mobility key (MIP_KEY) which is stored together with the respective subscriber identity (T_ID) extracted, with the authentication server, on a subsequent receipt of a key request message transmitted during a registration of a subscriber, extracting a mobility identity (MIP_ID) of the subscriber contained therein and searching for an identical or uniquely assignable mobility identity (MIP_ID') which is able to be derived in accordance with a configurable derivation function (AF) from subscriber identity data (T_ID') stored in the authentication server, and with the authentication server, on finding a derived mobility identity (MIP_ID') which is able to be assigned identically or uniquely to the extracted mobility identity (MIP_ID), providing the stored associated generated mobility key (MIP_KEY) for cryptographic protection of mobility signaling messages of the registered subscriber.

In a preferred embodiment of the authentication server the subscriber identity is formed by an external subscriber identity NAI contained in the administration data of the authentication message which is provided for routing the authentication message to the authentication server.

In a preferred embodiment of the authentication server this server is located in a home network of the subscriber.

In a preferred embodiment of the method the mobility key is also provided to a PMIP client of the access network (ASN).

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 an example for a mobility binding table according to the related art;

FIG. 2 an example of a visitor list according to the related art

FIG. 10 a diagram to explain the method.

DETAILED DESCRIPTION OF THE PREFERRED EMBODIMENT

Figure 3:
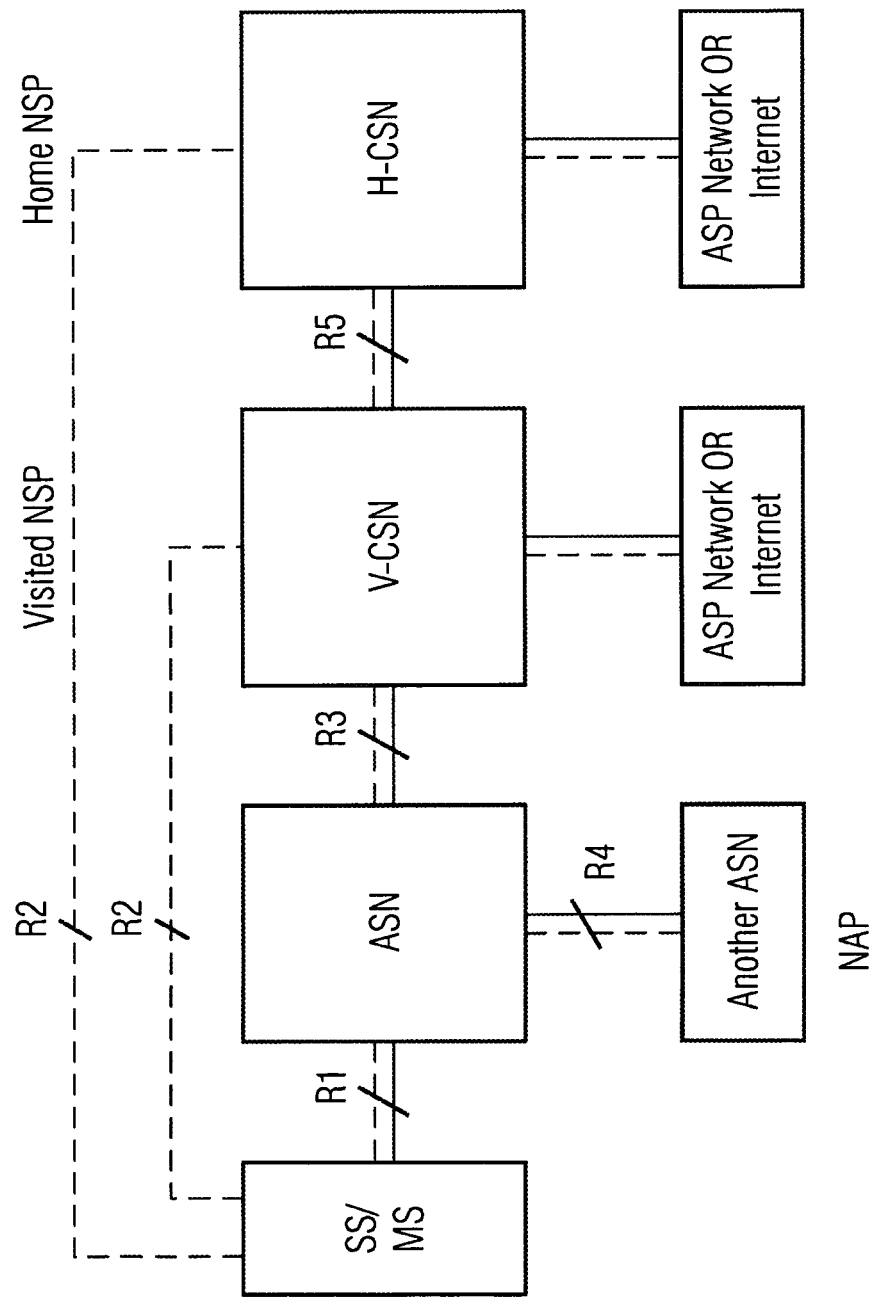
FIG. 3 a reference network structure for a WiMax radio network.
Figure 4:
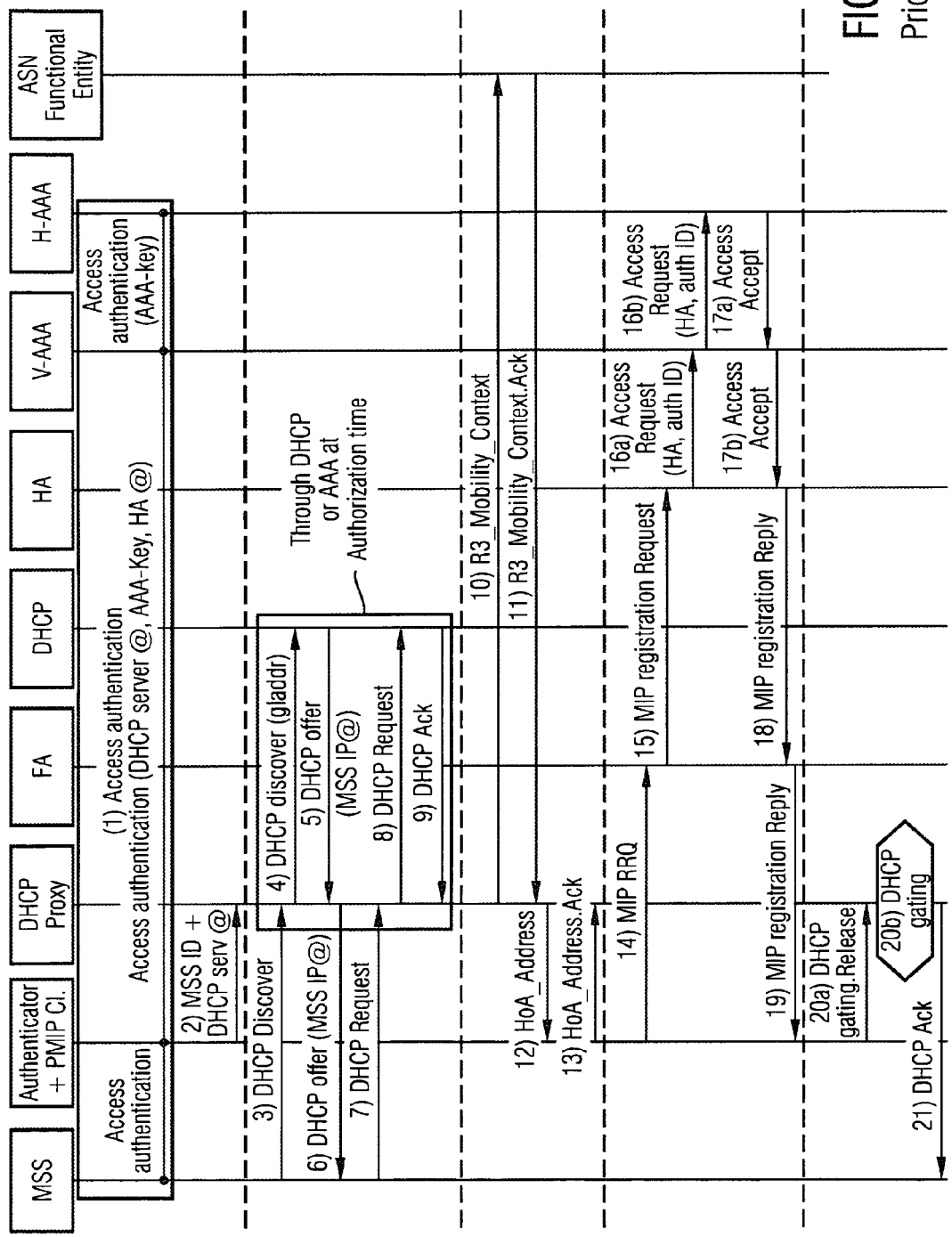
FIG. 4 a connection setup in a conventional WiMax network according to the related art.

Reference will now be made in detail to the preferred embodiments of the present invention, examples of which are illustrated in the accompanying drawings, wherein like reference numerals refer to like elements throughout.

Figure 5:
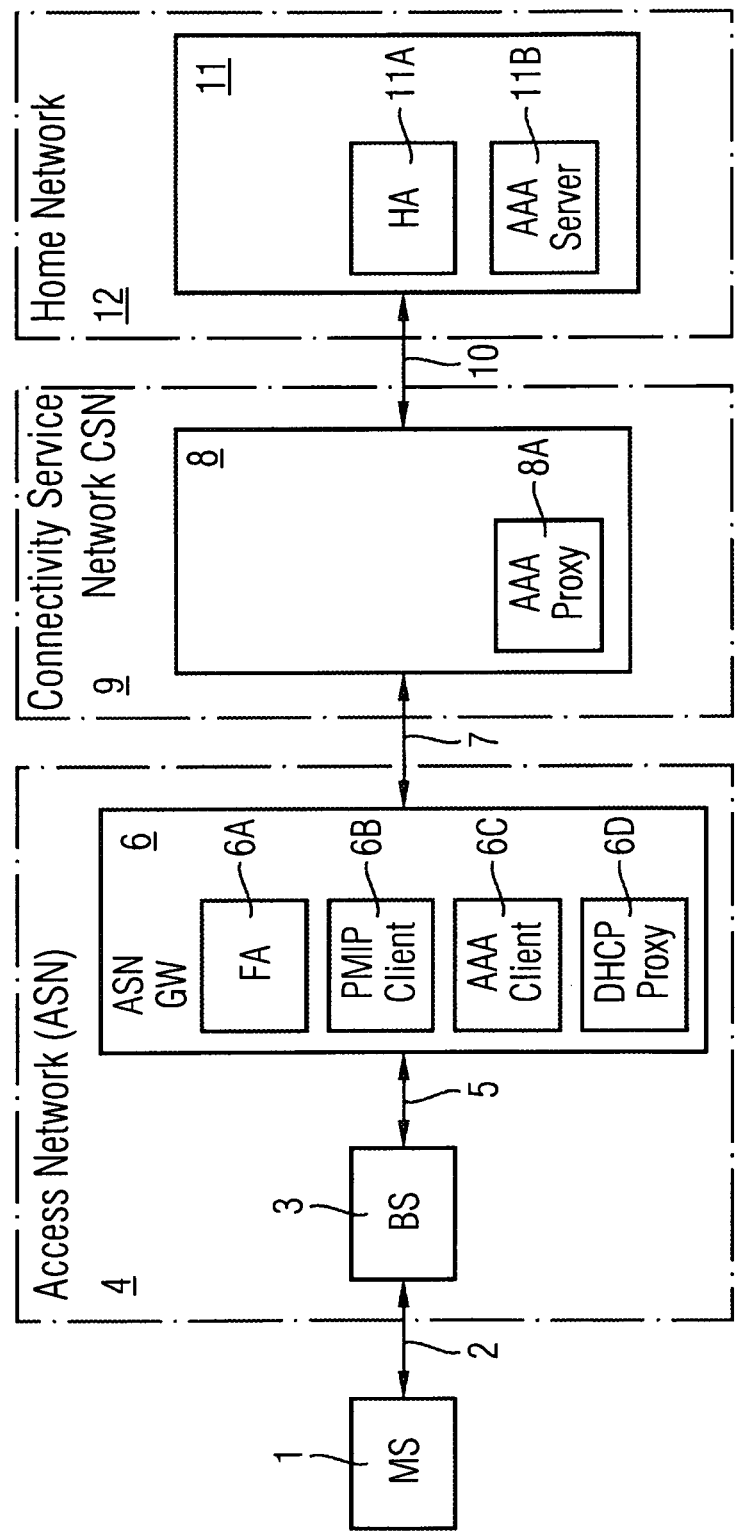
FIG. 5 a network structure in accordance with a preferred embodiment of the method proposed by the inventors.

As can be seen from FIG. 5, a mobile terminal 1 is connected via a wireless interface 2 to a base station 3 of an access network 4. The mobile station 1 is any type of mobile station, for example a laptop, a PDA, a mobile telephone, or any other mobile station The base station 3 of the access network 4 is connected via a data transmission line 5 to an access network gateway 6. Further functionalities are preferably integrated into the access gateway computer 6, especially a foreign agent 6A, a PMIP client 6B, an AAA client-server 6C and a DHCP proxy server 6D.

The foreign agent 6A is a router which provides routing services for the mobile station 1. The data packets directed to the mobile station 1 are transmitted tunneled and unpacked by the foreign agent 6A.

The gateway 6 of the access network 4 is connected via an interface 7 to a computer 8 of an intermediate network 9. The computer 8 preferably contains an AAA proxy server. A home agent 11A is located in the home network 12 within a computer 11 and is the representative of the mobile station 1. The home agent 11A is constantly informed about the current location of the mobile station 1. Data packets for the mobile station 1 are initially transmitted to the home agent 11A and from the home agent 11A are forwarded tunneled to the foreign agent 6A. Conversely data packets, which are sent out from the mobile station 1 are sent directly to the respective communication partner. The data packets of the mobile station 1 in such cases contain the home address as the sender address. The home address has the same address prefix, i.e. network address and subnet address, as the home agent 11A. Data packets which are sent to the home address of the mobile station 1 are captured by the home agent 11A and transmitted tunneled from the home agent 11A to the care-of address of the mobile station 1 and finally to the end point of the tunnel, i.e. are received by the foreign agent 6A or the mobile station 1 itself.

The computer 8 of the intermediate network 9 is connected via a further interface 10 to an authentication server 11B of the home network 12. The home network 12 is for example a 3GPP network for UMTS. In an alternate embodiment the server 11B is an authentication server of a WLAN network.

Figure 6:
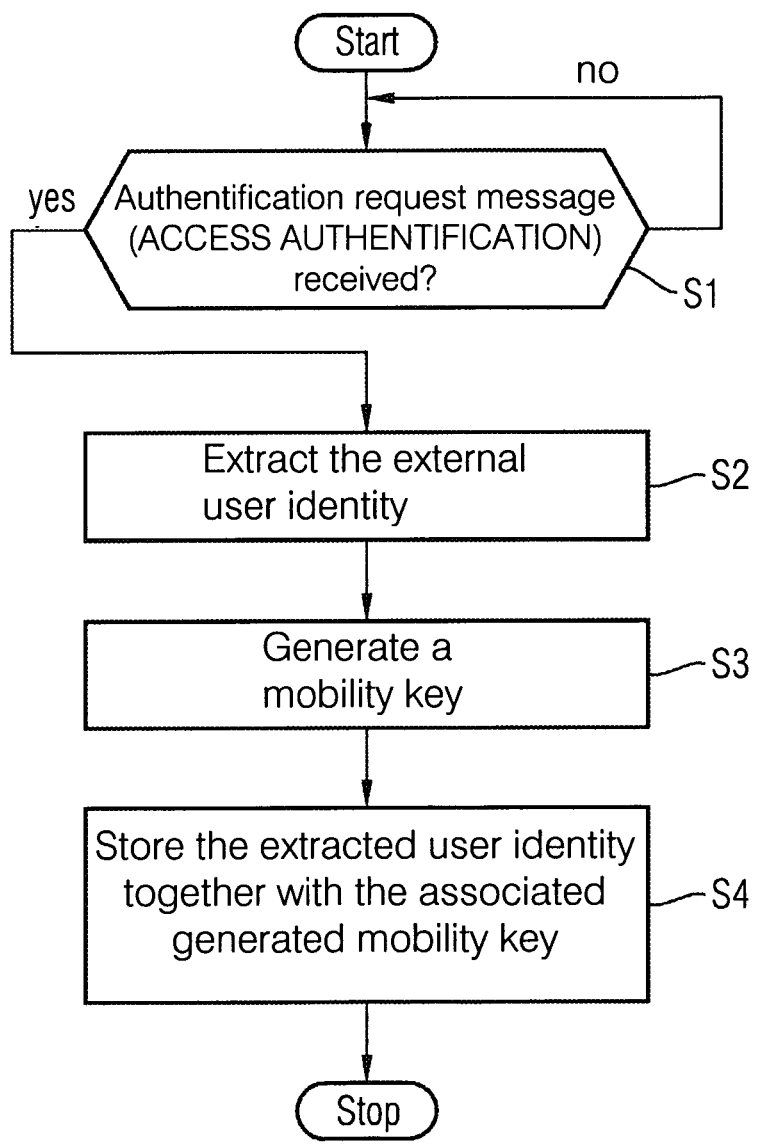
FIG. 6 a flowchart to explain how the method functions.

FIG. 6 shows a flowchart for illustrating a preferred embodiment of the method. The authentication server 11A, which is preferably located in a home network 12 of the subscriber, monitors in a step S1 continuously or at regular intervals whether it is receiving an access authentication.

Figure 9A:
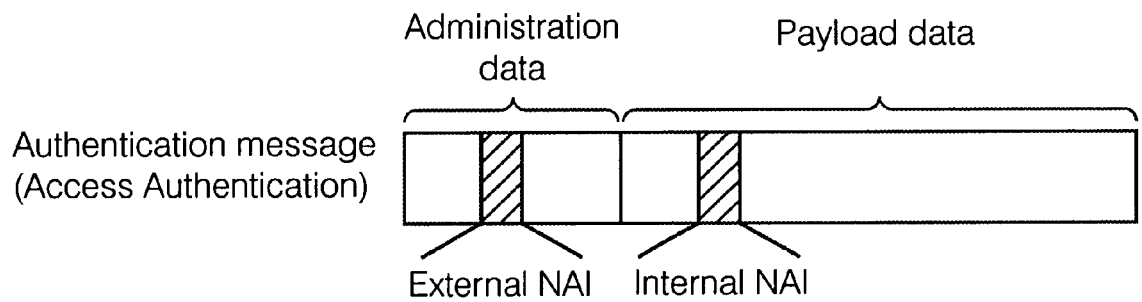
FIG. 9 data structures of different data packets used in the method.

The data structure of such an access authentication is shown in FIG. 9A. In a preferred embodiment the access authentications are embodied by data packets, with the administration data in each case containing an external subscriber identity NAI and the payload data preferably containing an internal subscriber identity. The external subscriber identity NAI is used for routing the data packet to the authentication server 11B of the home network 12. The external subscriber identity preferably involves a so-called network access identifier (NAI). The network access identifier NAI can for example involve an anonymous subscriber identity (e.g. "Guest") or a pseudonym subscriber identity (e.g. "Superman" or "127403L") selected by the subscriber. A specific user name can also be contained as the external subscriber identity in the access authentication. In one possible embodiment the external subscriber identity is embodied by a cryptographic hash function value H(r), with r for example being a random number or a randomly selected character string.

The internal subscriber identity contained in the payload data of the access authentication, as is shown in FIG. 9A, is formed for example by a unique user name or by a telephone number (IMSI, International Mobile User Identity; or MSISDN Mobile Station International PSTN/ISDN number).

If the authentication server 11B receives an access authentication, as is shown in FIG. 9A, it extracts in step S2 the external subscriber identity NAI contained in said message.

Subsequently in the step S3 the authentication server 11B generates a mobility key (MIP KEY). The mobility key can be generated in any given manner. For example the mobility key is generated as a random number.

In an alternate embodiment the mobility key is generated within the framework of the network access authentication using a cryptographic key negotiation protocol. Known cryptographic key negotiation protocols are for example EAP-SIM, EAP-AKA and EAP-TLS.

In an alternate embodiment the mobility key is derived from the extracted external subscriber identity in accordance with any given derivation function AF.

In a step S4 the authentication server 11B stores the extracted subscriber identity NAI together with the associated generated mobility key (MIP_key). The execution sequence depicted in FIG. 6 is undertaken during the network registration or authentication of the subscriber.

Figure 8:
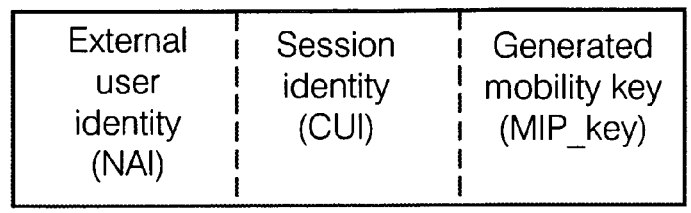
FIG. 8 a table for explaining the functioning of the method.

FIG. 8 shows schematically the information stored according to the process in FIG. 6 in the authentication server 11B. The authentication server 11B stores the extracted external subscriber identity NAI internally and stores a generated mobility key MIP KEY for it in each case.

In a preferred embodiment, in addition to the external subscriber identity NAI a session ID of the subscriber is stored, with this typically involving an accounting identity for accounting of costs CUI (chargeable user ID) of the subscriber. The chargeable user ID is transferred to the radius client (network access server) of the authentication server as part of registering with the network. The chargeable user ID CUI, which is preferably used as a session-specific identity of the subscriber, is entered into the mobile IP request and into a radius access request from the foreign agent 6A to the authentication server 11B. The entry is made by the foreign agent 6A or PMN (PMIP client) and not by the client server of the mobile station MS, since the latter does not know the chargeable user ID. This is possible with PMIP since the registration request is not sent by the client server with PMIP. The authentication server 11B administers the status data record for the chargeable user ID and the assigned MIP key, in order to supply the matching mobility key when requested to do so by the home agent 11A. The provision of a session ID or CUI is optional in the method.

Figure 9B:
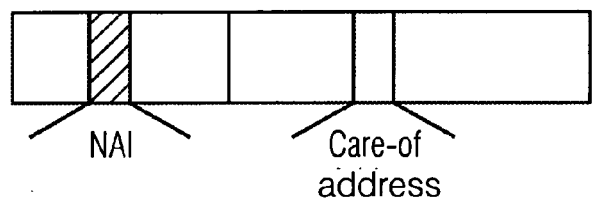
Figure 9C:
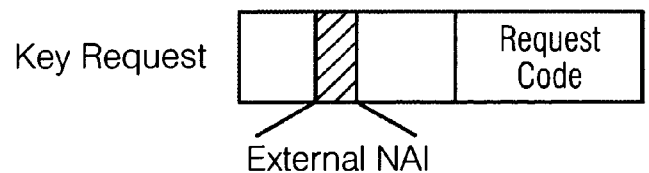

After the access authentication and the subsequent IP address assignment the MIP registration of the subscriber is undertaken later. To this end, when registering with a home agent 11A, the subscriber sends a registration request message (MIP RRQ), which contains a subscriber identity of the subscriber. The structure of such a registration request message is shown in FIG. 9. The registration request message preferably includes in such cases a data packet which contains items such as a subscriber identity NAI and the current care-of address of the subscriber; The home agent 11A of the subscriber receives the registration request message and derives a mobility identity of the registering subscriber from the subscriber identity in accordance with a configurable derivation function AF.

In an alternate embodiment of the mobility identity of the subscriber is derived from the subscriber identity NAI contained in the registration request message and a session identity of the subscriber in accordance with a further configurable derivation function AF. The derivation functions AF can involve any given functions.

Figure 7:
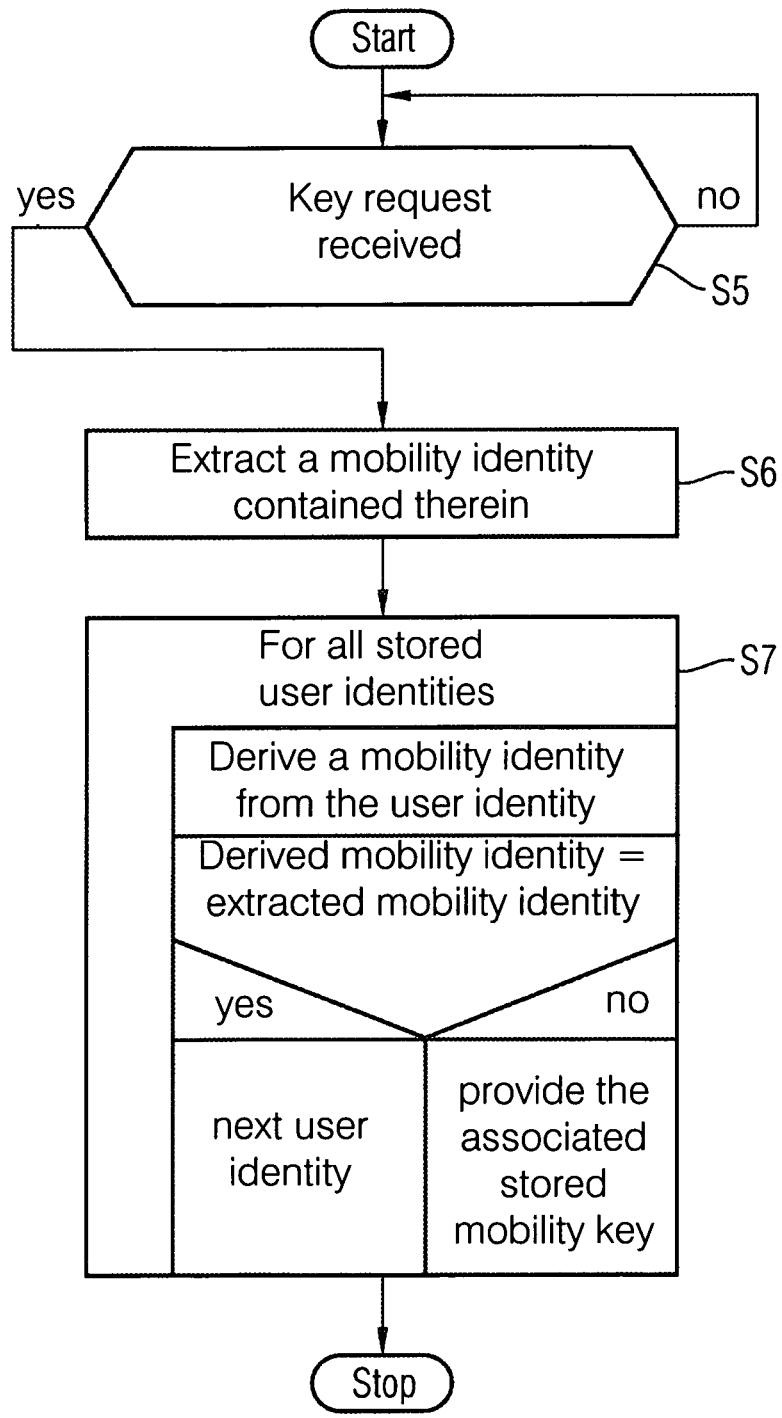
FIG. 7 a further flowchart for illustrating the functioning of the method.

The home agent 11A sends a key request message to the authentication server 11B. The authentication server 11B continuously monitors, as can be seen in FIG. 7, whether it receives a key request message. The data structure of such a key request message is shown for example in FIG. 9C. The key request message is preferably embodied by a data packet which contains as the external subscriber identity NAI the mobility identity extracted by the home agent 11A from the registration request message. The data packet is labeled key request.

In a step S6 the authentication server extracts the mobility identity (MIP_ID) contained in the key request message.

Subsequently, in a step S7, the authentication server 11B searches for a subscriber that has an identical or uniquely assignable mobility identity which can be derived in accordance with the predetermined derivation function AF from a subscriber identity stored in step S4 in the authentication server 11B. To do this the authentication server 11B derives in accordance with a predetermined derivation function for each subscriber identity stored by it a corresponding mobility identity MIP_ID and compares this with the extracted mobility identity MIP_ID. As soon as the authentication server 11B finds a subscriber for which the derived mobility identity MIP_ID is identical or is able to be uniquely assigned to the extracted mobility identity, it makes available to the home agent 11A the mobility key (MIP KEY) stored for this purpose for cryptographic protection of the mobility signaling messages of the registered subscriber.

The execution sequences shown in FIGS. 6, 7 can be summarized as follows. Firstly during the registration of the subscriber with the network a generated mobility key MIP_KEY together with the external subscriber identity NAI is stored by the authentication server 11B.
Extract NAI from Access Authentication Message
Generate MIP_Key
Store (NAI, MIP_Key)

Subsequently, during the MIP registration of the subscriber by the authentication server 11B, a uniquely assigned mobility key (MIP_KEY) is provided.
Extract MIP_ID from KEY Request Message
For all NAI MIP_ID'=function (NAI)
IF MIP_ID'=MIP_ID THEN OUTPUT MIP_KEY In an alternate embodiment, instead of step S7 shown in FIG. 7, the authentication server 11B derives a respective identity from the stored subscriber identity using a first derivation function and from the mobility identity using a second derivation function and compares these two. As soon as the authentication server 11B finds a subscriber for which the identity derived from the mobile identity MIP_ID is identical to the identity derived from the mobility identity MIP_ID, it makes available to the home agent 11A the mobility key (MIP KEY) stored for this data for cryptographic protection of mobility signaling messages of the registered subscriber.

Extract MIP_ID from KEY Request Message
For all NAI MIP_ID'=function (NAI)
IF MIP_ID'=function2 (MIP_ID) THEN OUTPUT MIP_KEY In a further alternate embodiment, instead of the step S7 shown in FIG. 7, the authentication server makes available that mobility key which is stored for that external subscriber identity which is able to be derived from the mobility identity in accordance with a predetermined configurable derivation function.

Extract MIP_ID from KEY Request Message
For all NAI MIP_ID'=NAI
IF MIP_ID'=function (MIP_ID) THEN OUTPUT MIP_KEY The method is especially suitable for WiMax mobile radio networks.

FIG. 10 shows a diagram for a explaining the connections setup for Client-MIP in the method.

The subscriber identity of the subscriber is formed in one embodiment of the method by the mobile subscriber station 1 or by a PMIP client of the access network 4. The generated subscriber identity can be modified by an authentication client 6C or by a foreign agent of the access network 4.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for providing a mobility key for cryptographic protection of mobility signaling messages, comprising:
   receiving an authentication message as a data packet that includes administration data and payload data, the administration data containing an external subscriber identity of the subscriber and the payload data containing a subscriber-specific internal subscriber identity, the authentication message being received by the authentication server upon registration of the subscriber with the network, the external subscriber identity being modified by an authentication client or a foreign agent of an access network to form the internal subscriber identity;
   generating the mobility key during a time in which the subscriber is registered or authenticated with the network, the mobility key being derived to correspond with the external subscriber identity contained in the authentication message;
   storing the mobility key in the authentication server together with the corresponding external subscriber identity and with a chargeable subscriber identity that is used as a session-specific identity of the subscriber;
   receiving a key request at the authentication server from the home agent, the key request containing a mobility identity;
   deriving a tester mobility identity from the external user identity stored in authentication server, the tester mobility identity being derived by a predetermined configurable derivation function;
   comparing the tester mobility identity with the mobility identity contained in the key request; and
   providing the home agent with the mobility key corresponding to the external user identity if the tester mobility identity is the same as the mobility identity contained in the key request, the mobility key being provided by the authentication server, wherein
   the chargeable subscriber identity is included in the authentication message that is received by the authentication server upon registration of the subscriber with the network.

2. The method as claimed in claim 1, wherein
   the authentication server, after receiving the authentication message, generates the mobile key,
   the mobility key is generated for the subscriber, and
   the authentication server stores the mobility key together with the external subscriber identity contained in the authentication message.

3. The method as claimed in claim 1, wherein
   when the subscriber registers with the home agent, the subscriber sends a registration request message which contains a subscriber identity of the subscriber, to the home agent.

4. The method as claimed in claim 3, wherein
   the mobility identity of the subscriber is derived from the subscriber identity contained in the registration request message in accordance with the configurable derivation function.

5. The method as claimed in claim 3, wherein
   the mobility identity of the subscriber is derived from the subscriber identity contained in the registration request message and from a session identity of the subscriber in accordance with the configurable derivation function.

6. The method as claimed in claim 3, wherein
   the registration request message is embodied as a data packet which contains the external subscriber identity and a current care-of address assigned to the subscriber.

7. The method as claimed in claim 1, wherein
   the external subscriber identity is formed by a network access identifier.

8. The method as claimed in claim 1, wherein
   the external subscriber identity is formed by an anonymous network access identifier NAI.

9. The method as claimed in claim 1, wherein
   the external subscriber identity is formed by a session-specific pseudonymous network access identifier NAI.

10. The method as claimed in claim 1, wherein
    the external subscriber identity is formed by a hash function value of the mobility identity.

11. The method as claimed in claim 1, wherein
    the mobility identity is formed by a hash function value of the external subscriber identity.

12. The method as claimed in claim 11, wherein
    the key request is formed by a data packet containing administration data and payload data, and
    the administration data contains the mobility identity.

13. The method as claimed in claim 1, wherein
    the external subscriber identity is formed by a mobile subscriber station or by a PMIP client of an access network.

14. The method as claimed in claim 1, wherein
    the internal subscriber identity is formed by a unique subscriber name.

15. The method as claimed in claim 1, wherein
    the internal subscriber identity is formed by a predetermined telephone number.

16. The method as claimed in claim 1, wherein
    the external subscriber identity forms an address for routing the data packet to the authentication server.

17. The method as claimed in claim 1, wherein the access network is a Wimax network.

18. An authentication computer server for providing a mobility key, comprising:
 a memory to store mobility keys together with corresponding external subscriber identities and with chargeable subscriber identities that are used as a session-specific identities of the subscriber;
 a computer configured to cause execution of:
 receiving an authentication message as a data packet that includes administration data and payload data, the administration data containing an external subscriber identity of the subscriber and the chargeable subscriber identity of the subscriber and the payload data containing a subscriber-specific internal subscriber identity, the authentication message being received upon registration of the subscriber with the network, the external subscriber identity being modified by an authentication client or a foreign agent of an access network to form the internal subscriber identity;
 generating the mobility key during a time in which the subscriber is registered or authenticated with the network, the mobility key being derived to correspond with the external subscriber identity contained in the authentication message;
 receiving a key request from a home agent, the key request containing a mobility identity;
 deriving a tester mobility identity from the external user identity stored in the memory, the tester mobility identity being derived by a predetermined configurable derivation function and comparing the tester mobility identity with the mobility identity contained in the key request; and
 providing the home agent with the mobility key corresponding to the external user identity if the tester mobility identity is the same as the mobility identity contained in the key request.

19. The authentication computer server as claimed in claim 18, wherein
 the administration data is intended for routing the authentication message to the authentication server.

20. The authentication computer server as claimed in claim 18, wherein
 the authentication server is provided in a home network of the subscriber.

* * * * *